United States Patent
Wright et al.

(10) Patent No.: US 11,652,831 B2
(45) Date of Patent: May 16, 2023

(54) PROCESS HEALTH INFORMATION TO DETERMINE WHETHER AN ANOMALY OCCURRED

(71) Applicant: HEWLETT PACKARD ENTERPRISE DEVELOPMENT LP, Houston, TX (US)

(72) Inventors: Joseph Wright, Houston, TX (US); Chris Davenport, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 505 days.

(21) Appl. No.: 16/848,373

(22) Filed: Apr. 14, 2020

(65) Prior Publication Data

US 2021/0320936 A1    Oct. 14, 2021

(51) Int. Cl.
| | |
|---|---|
| H04L 9/40 | (2022.01) |
| G06F 11/07 | (2006.01) |
| G06N 3/08 | (2023.01) |
| G06F 8/65 | (2018.01) |

(52) U.S. Cl.
CPC ............ *H04L 63/1425* (2013.01); *G06F 8/65* (2013.01); *G06F 11/0709* (2013.01); *G06N 3/08* (2013.01); *H04L 63/1441* (2013.01); *G06F 2218/12* (2023.01)

(58) Field of Classification Search
USPC ..................................................... 726/22–25
See application file for complete search history.

(56) References Cited

U.S. PATENT DOCUMENTS

| | | | | |
|---|---|---|---|---|
| 8,204,717 | B2 * | 6/2012 | McLaughlin | ...... G05B 19/4183 |
| 8,832,465 | B2 * | 9/2014 | Gulati | ..................... G06F 21/72 |
| | | | | 713/192 |
| 9,319,426 | B2 * | 4/2016 | Webb | ..................... H04L 63/145 |
| 9,386,034 | B2 * | 7/2016 | Cochenour | ......... H04L 63/1425 |
| 9,979,606 | B2 * | 5/2018 | Gupta | ..................... H04L 43/08 |
| 10,373,065 | B2 * | 8/2019 | Suleiman | ............... G06N 20/00 |
| 10,691,528 | B1 * | 6/2020 | Ferreira | .............. G06F 11/1438 |
| 11,423,327 | B2 * | 8/2022 | Kocberber | ............... G06N 5/01 |
| 2012/0053925 | A1 * | 3/2012 | Geffin | .................. H05K 7/1498 |
| | | | | 703/21 |

(Continued)

OTHER PUBLICATIONS

Hou et al.; On-Chip Analog Trojan Detection Framework for Microprocessor Trustworthiness; IEEE (Year: 2019).*

(Continued)

*Primary Examiner* — Kambiz Zand
*Assistant Examiner* — Mahabub S Ahmed
(74) *Attorney, Agent, or Firm* — Trop, Pruner & Hu, P.C.

(57) ABSTRACT

Examples disclosed herein relate to processing health information of a computing device according to a deep learning model to determine whether an anomaly has occurred. Multiple computing devices can be part of a system. One of the computing devices includes a host processing element, a management controller separate from the host processing element, and a deep learning model that includes parameters that are trained to identify anomalistic behavior for the computing device. The management controller can receive health information from multiple components of the computing device and process the health information according to the deep learning model to determine whether an anomaly occurred.

18 Claims, 4 Drawing Sheets

(56) References Cited

U.S. PATENT DOCUMENTS

| | | | | |
|---|---|---|---|---|
| 2014/0019392 A1* | 1/2014 | Buibas | G06N 3/008 | |
| | | | 706/23 | |
| 2016/0011931 A1* | 1/2016 | Iijima | G06F 11/0727 | |
| | | | 714/15 | |
| 2016/0226985 A1* | 8/2016 | Yoon | G06F 21/53 | |
| 2016/0261465 A1* | 9/2016 | Gupta | H04L 12/2816 | |
| 2017/0034023 A1* | 2/2017 | Nickolov | H04L 43/0817 | |
| 2017/0076116 A1* | 3/2017 | Chen | G06F 21/554 | |
| 2017/0169357 A1* | 6/2017 | Caspi | H04B 1/3822 | |
| 2017/0188946 A1* | 7/2017 | Klusmann | G01P 1/023 | |
| 2017/0278323 A1* | 9/2017 | Gupta | H04W 12/12 | |
| 2017/0364792 A1* | 12/2017 | Chai | G06N 3/044 | |
| 2018/0198812 A1* | 7/2018 | Christodorescu | H04L 63/1425 | |
| 2018/0212979 A1* | 7/2018 | Nakamura | H04L 63/1408 | |
| 2018/0288080 A1* | 10/2018 | Keller | H04L 63/1425 | |
| 2018/0288090 A1* | 10/2018 | Olarig | H04L 63/1458 | |
| 2018/0307551 A1* | 10/2018 | Bacha | G06N 3/084 | |
| 2019/0156039 A1 | 5/2019 | Harsany et al. | | |
| 2019/0340048 A1* | 11/2019 | Brown | G06F 11/0724 | |
| 2019/0340684 A1* | 11/2019 | Belanger | G06N 3/044 | |
| 2019/0349271 A1* | 11/2019 | Dale | H04L 69/324 | |
| 2020/0053109 A1* | 2/2020 | Lancioni | H04L 63/1425 | |
| 2020/0134423 A1* | 4/2020 | Shinde | G06N 3/045 | |
| 2020/0151587 A1* | 5/2020 | Ahringer | H04N 21/258 | |
| 2020/0210647 A1* | 7/2020 | Panuganty | G06N 20/10 | |
| 2020/0213343 A1* | 7/2020 | Bharrat | G06N 3/045 | |
| 2020/0366690 A1* | 11/2020 | Cheng | G06N 3/08 | |
| 2021/0048808 A1* | 2/2021 | Bielby | G06N 3/08 | |
| 2021/0049471 A1* | 2/2021 | Kale | G06N 3/084 | |
| 2021/0073063 A1* | 3/2021 | Kale | G06F 11/3058 | |
| 2021/0073066 A1* | 3/2021 | Bielby | G06F 11/0739 | |
| 2021/0112090 A1* | 4/2021 | Rivera | H04L 63/1441 | |
| 2021/0192860 A1* | 6/2021 | Kale | G06N 3/08 | |
| 2021/0201139 A1* | 7/2021 | Basset | B25J 9/161 | |
| 2021/0208781 A1* | 7/2021 | Chen | G06F 3/0604 | |
| 2021/0255799 A1* | 8/2021 | Kale | G06N 3/049 | |
| 2021/0295231 A1* | 9/2021 | Cmielowski | G06N 20/00 | |

OTHER PUBLICATIONS

Ruiz et al.; On-chip Debugging-based Fault Emulation for Robustness Evaluation of Embedded Software Components; IEEE (Year: 2002).*

Delgado et al., "EPA-RIMM: A Framework for Dynamic SMM-based Runtime Integrity Measurement", Semantic Scholar, 2018, 13 pages.

* cited by examiner

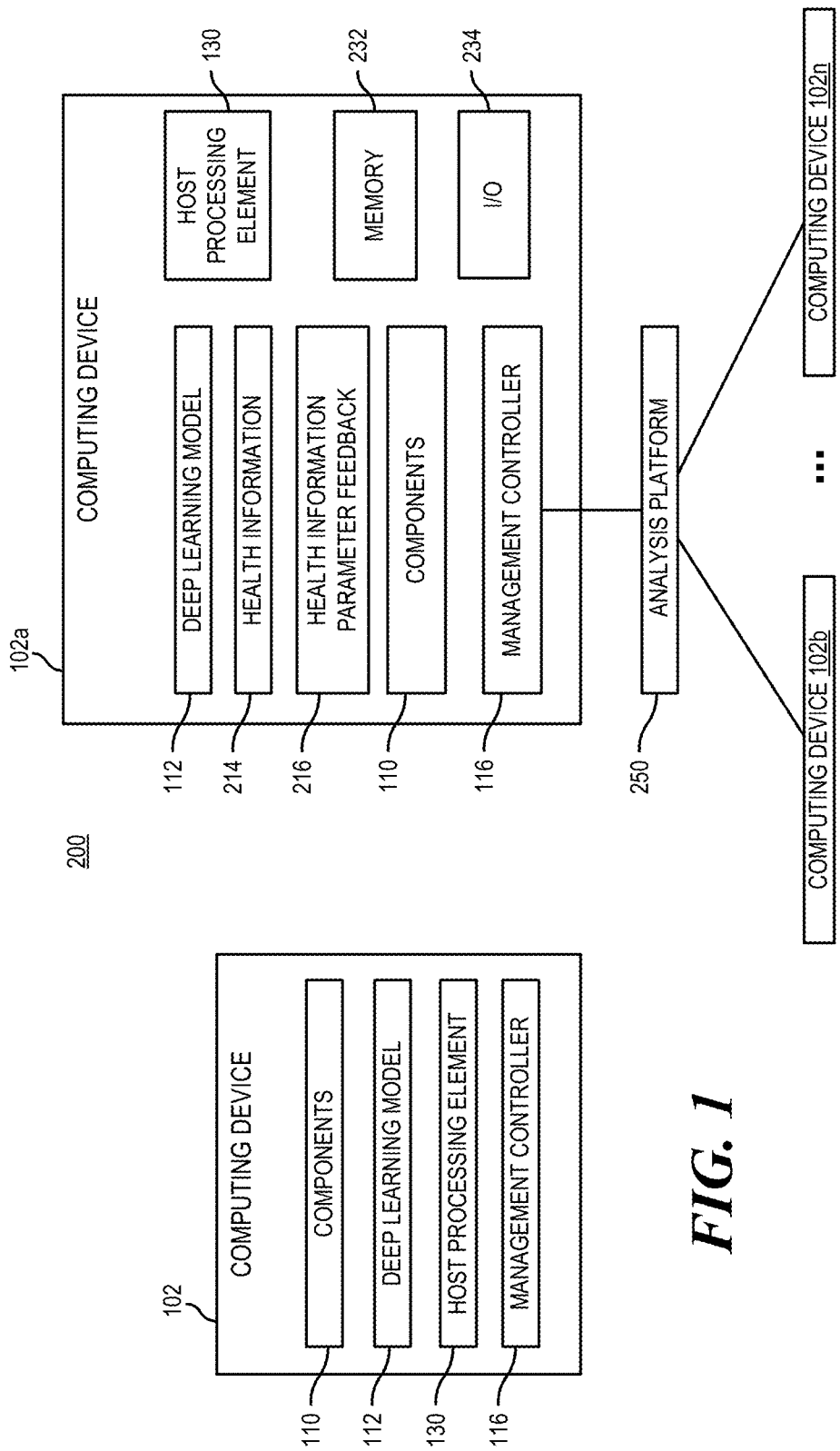

PROCESS HEALTH INFORMATION TO DETERMINE WHETHER AN ANOMALY OCCURRED

BACKGROUND

Information Technology companies and manufacturers are challenged to deliver quality and value to consumers, for example by providing computing devices with high availability and/or secure. High availability is a characteristic that aims to ensure a level of operational performance, such as uptime for a period higher than a system that does not have the high availability characteristic. Systems may become infected with malware or have other anomalies that can be detrimental to consumers.

BRIEF DESCRIPTION OF THE DRAWINGS

The following detailed description references the drawings, wherein:

FIG. 1 is a block diagram of a computing device with a management controller capable to process health information associated with the computing device according to a deep learning model to determine whether an anomaly has occurred, according to an example;

FIG. 2 is a block diagram of a system capable of updating and using a deep learning model to determine if an anomaly has occurred, according to an example;

Figure 3:
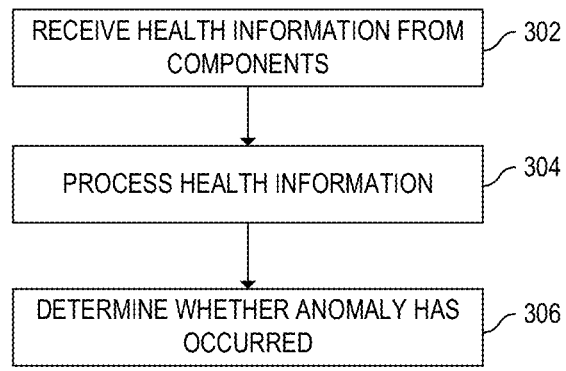
FIG. 3 is a flowchart of a method for determining whether an anomaly has occurred at a computing device using a management controller and a deep learning model, according to an example.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Information Technology companies and manufacturers are challenged to deliver quality and value to consumers, for example by providing computing devices with high availability and/or secure. High availability is a characteristic that aims to ensure a level of operational performance, such as uptime for a period higher than a system that does not have the high availability characteristic. Further, systems may become infected with malware or have other anomalies that can be detrimental to consumers.

Modern network security practices are well equipped against external threats, such as, a distributed denial of service attack. However, a challenge for networks has been physical intrusion, where malware is able to penetrate physical boundaries and proliferate across the network from the inside. These physical intrusions can be directed or accidental, regardless of intent, or company procedures. For example, Universal Serial Bus (USB) flash drives are able to find their way into the most secure network boundaries. If malware is present on the USB flash drive, it can infect a computing device and then that computing device can infect others within the network.

A management controller (e.g., a baseboard management controller) of a computing device on the network system can leverage out-of-band positioning to directly interface with host network, processor, storage, memory, power-supply devices, etc. The management controller, thus, has a trusted view of the computing device's device configuration, status, and performance metrics. Monitoring techniques described herein can augment system security with real-time detection of behavior abnormalities. When an abnormality occurs, an action can be taken, for example, alerting supervisors, approved corrective actions, updating a model to include the anomaly as permissible, etc.

In some examples, the management controller can monitor devices through direct channels such as (Peripheral Component Interconnect) PCI express, USB, a channel interface driver, etc. to ensure the data is uncompromised. These data points can measure against desired thresholds or intelligently constructed models to determine if a threat is active and a whether response is necessary. In some examples, threat responses can be alerts, reactive attempts to quell a threat, preemptive efforts to mitigate an eminent threat or perceived vulnerability, or the like.

An intelligently created model can be created using machine learning for specific workloads. A model for a group of computing devices expected to be working on a specified workload can be trained. In some examples, a benchmark load for the workload can be used in a training group to create the model. During the benchmarking, management controllers of each computing device being monitored can take get health information from components of the respective computing device. The health information can then be sent to an analysis platform. The analysis platform can take volumes of health information from multiple computing devices to create a deep learning model of normal operation of the computing devices during the workload.

The deep learning model can be implemented in a production environment at a management controller. In some examples, the computing devices can be monitored by the management controller on the computing device using the deep learning model. If there is an anomaly detected by a management controller, it can perform an action. The action can be a reporting action such as notifying an administrator of the issue. In other examples, the action can include alerting other management controllers on an associated management network of the anomaly or a diagnosis based on the anomaly. In further examples, the management controller that detected the anomaly or the associated management controllers may perform an action on their computing devices, such as isolating network traffic, quarantining, etc.

Examples of deep learning models include usage of Recurrent Neural Networks (RNN) for processing system events to determine what events collected in health information are part of the normal workload usage. Prior logs can be used to train the deep learning network to be used in the field. Feedback from production workloads can be used to reinforce and update the model.

In one example, the computing device can include a server. A management controller such as a baseboard management controller (BMC) can be used to perform the analysis on incoming health information according to the deep learning model. BMCs provide so-called "lights-out" functionality for computing devices. The lights out functionality may allow a user, such as a systems administrator to perform management operations on the computing device even if an operating system is not installed or not functional on the computing device. Moreover, in one example, the BMC can run on auxiliary power, thus the computing device need not be powered on to an on state where control of the computing device is handed over to an operating system after boot. As examples, the BMC may so-called provide management and so-called "out-of-band" services, such as remote console access, remote reboot and power management functionality, access to system logs, and the like. As used herein, a BMC has management capabilities for subsystems of a computing device, and is separate from a processor that executes a main operating system of a computing device. The BMC may comprise an interface, such as a network interface, and/or serial interface that an administrator can use to remotely communicate with the BMC.

As noted, the BMC can have access to system logs and health information. In one example, system components such as hardware device and/or software executing on top of hardware can be configured to provide event information to the BMC.

FIG. 1 is a block diagram of a computing device with a management controller capable to process health information associated with the computing device according to a deep learning model to determine whether an anomaly has occurred, according to an example. FIG. 2 is a block diagram of a system capable of updating and using a deep learning model to determine if an anomaly has occurred, according to an example.

In the example of FIG. 1, the computing device 102 includes components 110, a deep learning model 112, a management controller 116, and a host processing element 130. In the example of FIG. 2, a computing system 200 includes multiple computing devices 102a, 102b-102n, one or more of the computing devices can include components 110, a deep learning model 112, a management controller 116, health information 214, health information parameter feedback 216, a host processing element 130, memory 232, input/output 234, etc. Further, the computing system 200 may further include an analysis platform 250. In certain examples, the analysis platform 250 and one or more of the computing devices 102 can be connected via a network. In some examples, the connection can be via a management network that connects one or more management controllers 116 to each other and/or administration nodes. In other examples, other networks, for example, a production network can be used to connect one or more of the computing devices 102. In some examples, the production network can be separate from the management network.

A management controller 116 in a production or test environment can communicate with components 110 of the computing device 102 to generate health information 214. The management controller 116 can use one or more bus to communicate with the components to receive health information. Examples of health information 214 can include temperature associated with a chip, such as one or more a central processing unit, memory, etc., log information, session counters, user action information, network packet counters, power consumption, error information, a record of firmware or software installed on the computing device, processing workload information, peripheral device configuration information, peripheral device sensor information, etc. In some examples, the health information 214 can be stored in a memory associated with the management controller 116. In one example, software installed on an operating system executing on the host processing element 130 can communicate with the management controller 116 via an interface, for example, using a driver and bus. Moreover, in some examples, the management controller 116 can be provided information about software executing on the host processing element 130, components 110 present on one or more bus (e.g., a PCIe bus, a network interface controller, a Non-Volatile Memory Host Controller, etc.). In some examples, the information can be communicated via a bus used for management, for example, a serial communication such as I2C, a system management bus, a controller area network (CAN) bus, etc. In other examples, input can be received in the form of configuration from a host or management platform via a management network.

In some examples, the health information 214 can be stored as logs or other data structures in a persistent memory or volatile memory. Different storage and receiving conditions may exist. For example, the management controller 116 may receive information about software installed on the computing device 102 less frequently than information from a temperature sensor.

As noted above, the deep learning model 112 can be based on a particular workload that the system 200 is associated with. Training the model can include using a benchmark workload. During the benchmark workload on one or more computing device, the associated management controllers 116 can access data from components of respective systems in a test environment and produce health data. The health data can be provided to an analysis platform that can generate the model. In some examples, the training using benchmark workloads can be considered pre-training the deep learning model for the specific workload. That deep learning model can further be updated based on additional feedback from computing devices.

Various deep learning models can be used. Examples of deep learning models include long short-term memory (LSTM), a convolution neural networks, recurrent neural networks, neural history compressor, recursive neural networks, gated recurrent unit (GRU), etc. An advantage to a recurrent neural network is the inclusion of feedback. The parameters used for the deep learning model can be updated based on feedback from computing device 102 or other devices as discussed herein.

In one example model, the health information can be processed as characters. In the example model, characters can represent registers provided from components or information associated with other systems logs. In one example, each character can be considered an input vector. A score for the event can be updated as each character is processed. During processing, these scores can be considered hidden. The updated scores can be included as an input vector along with the next character. The processing can continue until a character represents an end of the event. Different types of events for health information can be treated differently. For example, temperature information may process characters or multiples of characters representing temperatures while version numbers of firmware are can be differently processed as a separate event information.

In a Long Short Term Memory (LSTM) model, characters can be broken up by special characters and taken as a group (e.g., a group representing information associated with the event). For example, a first character may identify the event, a second, third, and fourth character may include log register information, and a special character (fifth character) may indicate that the information about the event is over. In this example, the five characters are meant to be processed together. Though a LSTM model is described, other approaches can be used, for example, a Gated Recurrent Unit.

The input events can be sourced from any software entity, field replaceable unit, component 110, or the like. In one example, a Deep Neural Network (DNN) makes immediate predictions as it consumes input vectors. A fully connected architecture can be employed with the final stage being the output that predicts whether an anomaly has occurred.

In some examples, the scores can be used to rank the probability that each of the event or a group of events represents an anomaly of normal operation of the computing device 102.

When the deep learning model 112 is used in production mode, the management controller 116 can process its respective health information 214 according to the deep learning model 112 to determine whether an anomaly has occurred based on the deep learning model 112.

In one example, the management controller 116 determines that an anomaly exists. The management controller 116 can classify the anomaly. In some examples, during model generation, the model can include classification based on the type of parameters associated with the anomaly. Further, in some examples, some of the training can be supervised, for example, specific workloads with anomalous behavior can be used as part of the workload used for training and can be associated with anomalous behavior. In one example, the training model may include information indicating that a known anomaly is occurring during a timeframe of the workload. In some examples, the management controller 116 can take an action in response to the determination that an anomaly has occurred based on the associated classification.

In one example, the classification is associated with an action to send an alert. In this example, an alert is sent to a management or analysis platform such as analysis platform 250. The alert may indicate that an anomaly is present and particular criteria associated with the anomaly.

Further, in some examples, the action can include a request for administrator feedback. For example, an administrator could be asked to confirm whether the anomaly is an issue. In one example, the administrator may indicate that the anomaly is not an issue and is instead consistent with a workload change. One example of such an occurrence would be when a maintenance event is occurring, such as an update of firmware packages, update of software, addition of new hardware, etc. Another example of such an occurrence would be a time when additional activity is occurring, for example, a Black Friday or a sales event on a retail sales server workload or a stay at home event increasing streaming server workloads or retail sales workloads.

In one example, the analysis platform receives an administrator response in response to the action. The administrator response can include an indication that the workload was changed. In response to the workload change, the deep learning model can be updated by the analysis platform 250. In one example, the update of the deep learning model includes health information parameter feedback from multiple computing devices 102a, 102b, 102n after the action occurred.

The health information parameter feedback 216 can be generated by the management controller 116. In some examples, the health information parameter feedback 216 can be gathered, stored, and then sent in batches. In one example, the health information parameter feedback 216 can include a collection of health information 214 collected over a time period. In another example, the health information parameter feedback 216 may be pre-processed. This can include, for example, counting the number of times a particular event has occurred, performing transformations on the data to help it be analyzed by the analysis platform 250, reduce the amount of data to send to the analysis platform, rescale data, standardize data, etc. Each of the computing devices 102 can generate a portion of the health information parameter feedback received by the analysis platform 250. Each portion can be associated with the respective computing device 102.

The analysis platform 250 receives the health information parameter feedback from the computing devices 102. The analysis platform 250 can update the deep learning model based on the deep learning model that was previously used and the health information parameter feedback using similar approaches as during training of the model. The feedback can be considered valid based on the administrator response to the anomaly. The updated deep learning model can be provided back to the computing device 102a and/or other computing devices 102b-102n.

The computing device 102a or another similar computing device such as computing device 102b can receive the updated deep learning model. The computing device 102 can use the updated deep learning model for determining whether an anomaly exists. In this example, one of the computing devices 102 retrieves additional health information 214 from its respective components 110. The additional health information 214 is processed according to the updated deep learning model. In one example, the management controller 116 can determine that a second anomaly has occurred. Another action can be taken in response to the determination.

Other examples of actions that can be taken in response to detection of an anomaly include, quarantine, updating of a software or firmware component, communicating with other management controllers of other computing devices, preemptive actions, and the like.

In one example of quarantine, the management controller 116 may quarantine the computing device 102 by quarantining the computing device 102, for example, by shutting down I/O 234. In another example, the management controller 116 may communicate with a host application or operating system to transfer workloads to another computing device prior to quarantine or shutdown of the computing device 102.

In one example, a preemptive action can be taken by another computing device 102n. In this example, the management controller 116 can provide information (e.g., via a notification) about the anomaly to other management controllers of other computing devices, for example computing device 102n. The management controller of computing device 102n can receive the notification about the anomaly. The management controller can perform another action on computing device 102n to preemptively avoid the anomaly.

In one example, the other action (or an action by the first computing device) may include not allowing a certain user associated with the anomaly to send information. In another example, the action can include turning off the network port. In a further action, the management controller 116 can request that an agent executing on the host processing element 130 perform a remedial action. For example, characteristics of a malicious or anomalous process can be provided to the agent and the agent can kill the process and similar processes. Other similar actions can be taken to prevent processes with similar characteristics from running. Further actions may include stopping rights to an entity to access/use a storage or network port.

In one example of updating software or a firmware component, the management controller 116 can detect an anomaly. The anomaly can be classified as being related to a firmware or software component. The anomaly can be that the computing device 102 has a different firmware or software version compared to the other computing devices in the group. In one example, the component can be set for update. The update may occur as part of a next scheduled maintenance time or dynamically. This can depend, for example, on the requirement for updating the component. In some examples, each of the computing devices 102a-102n can be of a same model as the computing device 102a. In other examples, a different model, but same architecture can be used. In other examples, the group of computing devices 102 can have a heterogeneous composition. The characteristics of the deep learning model can be different for each of these groupings.

Further, in certain examples, some or all of the health information 214 can be provided to the analysis platform 250 to update the deep learning model. This can be performed periodically, for example, health information 214 collected for a period (e.g., at a low workflow part of each day). The analysis platform 250 can process the health information 214 as a matter of course and send updated deep learning models 112 to the computing devices to use.

In one example use case, an employee brings a seemingly innocent universal serial bus (USB) flash drive. Once inserted into a computing device, malware is automatically installed and begins to spread to other systems on the production network. The malware on the employee's computing device is able to root into the operating system software, modifying behavior metrics, the computing device is reporting nothing out of the ordinary is taking place.

Then, the malware finds its way to a server equipped with a management controller 116, running this feature, where routine monitoring has established a healthy model of behavior. For example, the network interface card can source health information and perform metrics on transmit/receive utilization, bytes, packets, errors, and queue status to derive tangible behavioral metrics.

While the operating system (OS) executing on the host processing element 130 may be fooled through software manipulation, the hardware devices are not able to be modified. The management controller 116 is able to characterize the massive shift in network, processor, storage, memory, and power-supply activity as anomalous behavior. For example, the malware is causing the system processor to reach 100% utilization, and the power-supplies report a sharp increase in current draw. Comparing these metrics against the established behavior model, it is determined an attack is underway, and the configured response mechanism is triggered.

Policies can be used for classifying and implementing responses. Examples of configuration policies can include a priority message sent to an administrator, from the management controller 116, detailing the issue. In another example, the management controller 116 quarantines the infected computing device 102 from other systems on the network. In a further example, the infected system's management controller 116 broadcasts a message to neighboring management controllers 116 systems that a threat has been acknowledged, and prepare for an imminent threat.

If the malware attack is aimed to bombard host network bandwidth, the management controller 116 can be configured to send and receive messages through its dedicated network port. This interface is separate from the production network's subsystem and may not be infected while an OS or other software executing on the host processing element 130 is compromised. This allows the management controller 116 to provide an uncompromised interface for a network administrator to repair the system.

In some examples, the management controller can include a BMC. Management controller 116 can be used to implement services for the computing device 102. Management controller 116 can be implemented using a separate processor from the host processing element 130 that is used to execute a high level operating system. Management controller 116 can provide so-called "lights-out" functionality for computing devices. The lights out functionality may allow a user, such as a systems administrator, to perform management operations on the computing device 102 even if an operating system is not installed or not functional on the computing device. Moreover, in one example, the management controller 116 can run on auxiliary power, thus the computing device 102 need not be powered on to an on state where control of the computing device 102 is handed over to an operating system after boot. As examples, the management controller 116 may provide so-called "out-of-band" services, such as remote console access, remote reboot and power management functionality, monitoring health of the system, access to system logs, and the like. As used herein, a management controller 116 has management capabilities for sub-systems of a computing device 102, and is separate from a processor or host processing element 130 that executes a main operating system of a computing device (e.g., a server or set of servers).

As noted, in some instances, the management controller 116 may enable lights-out management of the computing device 102, which provides remote management access (e.g., system console access) regardless of whether the computing device 102 is powered on, whether a primary network subsystem hardware is functioning, or whether an OS is operating or even installed. The management controller 116 may comprise an interface, such as a network interface, and/or serial interface that an administrator can use to remotely communicate with the management controller 116. As used herein, an "out-of-band" service is a service provided by the management controller 116 via a dedicated management channel (e.g., the network interface or serial interface) and is available whether the computing device 102 is in powered on state.

In some examples, a management controller 116 may be included as part of an enclosure. In other examples, a management controller 116 may be included in one or more of the servers (e.g., as part of the management subsystem of the server) or connected via an interface (e.g., a peripheral interface). In some examples, sensors associated with the management controller 116 can measure internal physical variables such as humidity, temperature, power supply voltage, communications parameters, fan speeds, operating system functions, or the like. The management controller 116 may also be capable to reboot or power cycle the device. As noted, the management controller 116 allows for remote management of the device, as such, notifications can be made to a centralized station using the management controller 116 and passwords or other user entry can be implemented via the management controller 116.

In some examples, one or more of the components 110 may be associated with firmware. A firmware engine can be implemented using instructions executable by a processor and/or logic. In some examples, the firmware can be associated with one or more controllers that are part of the respective components 110.

In some examples, the firmware engine can be implemented as platform firmware. Platform firmware may include an interface such as a basic input/output system (BIOS) or unified extensible firmware interface (UEFI) to allow it to be interfaced with. The platform firmware can be located at an address space where the host processing element 130 (e.g., CPU) for the computing device 102 boots. In some examples, the platform firmware may be responsible for a power on self-test for the computing device 102. In other examples, the platform firmware can be responsible for the boot process and what, if any, operating system to load onto the computing device 102. Further, the platform firmware may be capable to initialize various components of the computing device 102 such as peripherals, memory devices 232, memory controller settings, storage controller settings, bus speeds, video card information, etc. In some examples, platform firmware can also be capable to perform various low level functionality while the computing device 102 executes. Moreover, in some examples, platform firmware may be capable to communicate with a higher level operating system executing on a CPU, for example via an advanced configuration and power interface (ACPI).

A host processing element 130, such as one or multiple central processing unit (CPU) or a microprocessor suitable for retrieval and execution of instructions and/or electronic circuits can be configured to perform the functionality of any of host processes described herein. In certain scenarios, instructions and/or other information, such as health information, can be included in memory 232 or other memory. Input/output interfaces 234 may additionally be provided by the computing device 102. For example, input devices, such as a keyboard, a sensor, a touch interface, a mouse, a microphone, etc. can be utilized to receive input from an environment surrounding the computing device 102. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

Communications networks can be used to communicate between the analysis platform 250 and computing devices 102. For example, a management network can be used to communicate between management controllers and the analysis platform 250. In other examples, a communication network can be used to connect one or more I/O of the computing devices to other devices (e.g., via the Internet or other network).

A communication network can use wired communications, wireless communications, or combinations thereof. Further, a communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, a communication network can be in the form of a direct network link between devices. Various communications structures and infrastructure can be utilized to implement the communication network(s).

Devices can communicate with each other and other components with access to a communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 4:
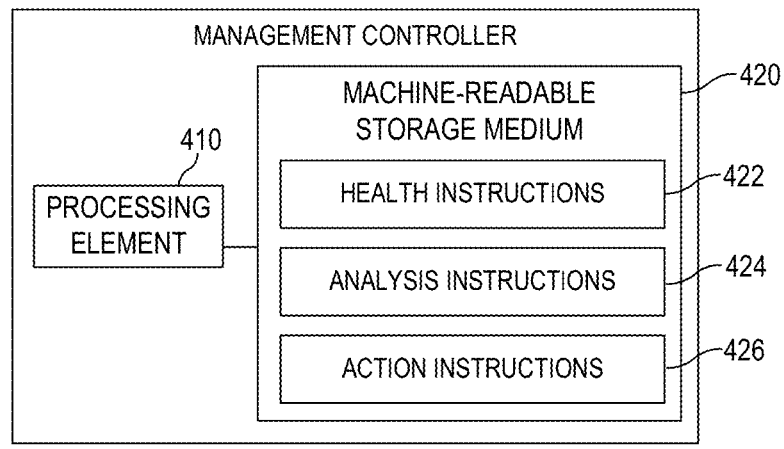
FIG. 4 is a block diagram of a management controller capable of determining whether an anomaly has occurred on a computing device, according to an example.

FIG. 3 is a flowchart of a method for determining whether an anomaly has occurred at a computing device using a management controller and a deep learning model, according to an example. FIG. 4 is a block diagram of a management controller capable of determining whether an anomaly has occurred on a computing device, according to an example. Though method 300 is shown as being implemented using management controller 400, other controllers such as management controller 116 can be used.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, or combinations thereof. Processing element 410 may fetch, decode, and execute instructions 422, 424, 426 to implement the processes described herein. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for processing health information to determine whether an anomaly has occurred.

As further described above, a management controller 400 can be part of a computing device. The computing device can be one of multiple computing devices in a system. The management controller 400 can be separate from a host processing element of the computing device. Further, the management controller 400 can have access to a deep learning model that has been trained according to a specific workload to determine whether anomalistic behavior is present based on health information. The deep learning model can be pre-trained for a specific workload and may be updated as an ongoing process.

At 302, the processing element 410 can execute health instructions 422 to receive health information from components of the computing device. The management controller 400 can use one or more bus to communicate with the components of the computing device to receive health information. Examples of health information can include temperature associated with a chip, such as one or more a central processing unit, memory, etc., log information, session counters, network packet counters, power consumption, error information, a record of firmware or software installed on the computing device, processing workload information, peripheral device configuration information, peripheral device sensor information, etc. In some examples, the health information can be stored in a memory accessible to the management controller 400.

In one example, software installed on an operating system executing on the host processing element can communicate with the management controller 400 via an interface, for example, using a driver and bus. Moreover, in some examples, the management controller 400 can be provided information about software executing on the host processing element, components present on one or more bus (e.g., a PCIe bus, a network interface controller, a Non-Volatile Memory Host Controller, etc.). In some examples, the information can be communicated via a bus used for management, for example, a serial communication such as I2C, a system management bus, a controller area network (CAN) bus, etc. In other examples, input can be received in the form of configuration from a host or management platform via a management network.

At 304, the processing element 410 can execute analysis instructions 424 to process the health information 304. The processing can be according to the type of deep learning model being used, for example, using a LSTM model, a GRU model, a deep neural network model, a convolution neural network model, a recurrent neural network model, etc. At 306, the analysis instructions 424 can be executed by processing element 410 to determine whether an anomaly has occurred. This can also be based on the deep learning model used. If an anomaly occurs, action instructions 426 can be executed by processing element 410 to perform an action in response to the determined anomaly.

Figure 5:
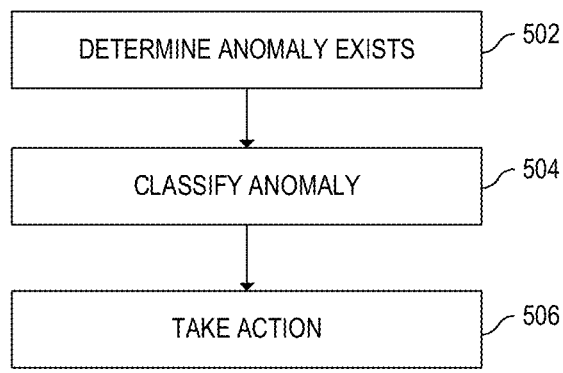
FIG. 5 is a flowchart of a method for taking an action in response to determining that an anomaly exists on a computing device, according to an example.

FIG. 5 is a flowchart of a method for taking an action in response to determining that an anomaly exists on a computing device, according to an example. Though method 500 is shown as being implemented using management controller 400, other controllers such as management controller 116 can be used.

At 502, the management controller 400 determines that an anomaly exists. As noted, this determination can be based on processing of health information as described above.

The management controller 400 can classify the anomaly at 504. As noted, in some examples, during model generation, the model can include classification based on the type of parameters associated with the anomaly. Further, in some examples, some of the training can be supervised, for example, specific workloads with anomalous behavior can be used as part of the workload used for training and can be associated with anomalous behavior. In one example, the training model may include information indicating that a known anomaly or type of anomaly is occurring during a timeframe of the workload.

In some examples, at 506, the management controller 400 can take an action in response to the determination that an anomaly has occurred based on the associated classification. Action instructions 426 can be executed by processing element 410 to perform the action. In one example, the classification is associated with an action to send an alert. In this example, an alert is sent to a management or analysis platform such as analysis platform 250 or 700. The alert may indicate that an anomaly is present and particular criteria associated with the anomaly.

Further, in some examples, the action can include a request for administrator feedback. For example, an administrator could be asked to confirm whether the anomaly is an issue. In one example, the administrator may indicate that the anomaly is not an issue and is instead consistent with a workload change. One example of such an occurrence would be when a maintenance event is occurring, such as an update of firmware packages, update of software, addition of new hardware, etc. Another example of such an occurrence would be a time when additional activity is occurring, for example, a Black Friday or a sales event on a retail sales server workload or a stay at home event increasing streaming server workloads or retail sales workloads.

In other examples, the action can include alerting other management controllers on an associated management network of the anomaly or a diagnosis based on the anomaly. In further examples, the management controller that detected the anomaly or the associated management controllers may perform an action on their computing devices, such as isolating network traffic, quarantining, updating of a software or firmware component, communicating with other management controllers of other computing devices, pre-emptive actions, and the like.

Moreover, in some examples, analysis instructions 424 can be executed to process health information to generate a portion of health information parameter feedback that can be sent to the analysis platform.

Further, the management controller 400 can receive updated deep learning models from the analysis platform. As noted above, this can be updated based on health information parameter feedback received from multiple computing devices. Other computing devices can act upon updated models based on health information from the management controller (e.g., by using the updated model on new health information to detect another anomaly).

Figure 6:
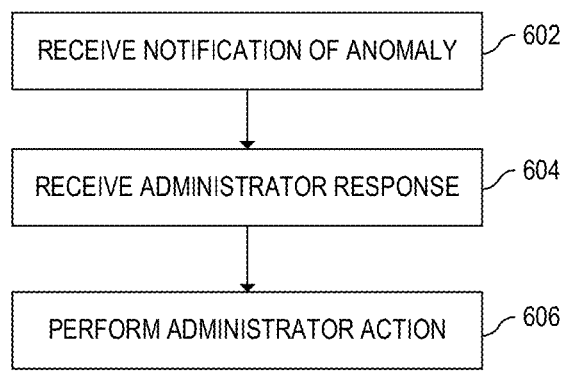
FIG. 6 is a flowchart of a method for taking an administrator action in response to determining that an anomaly exists on a computing device, according to an example.
Figure 7:
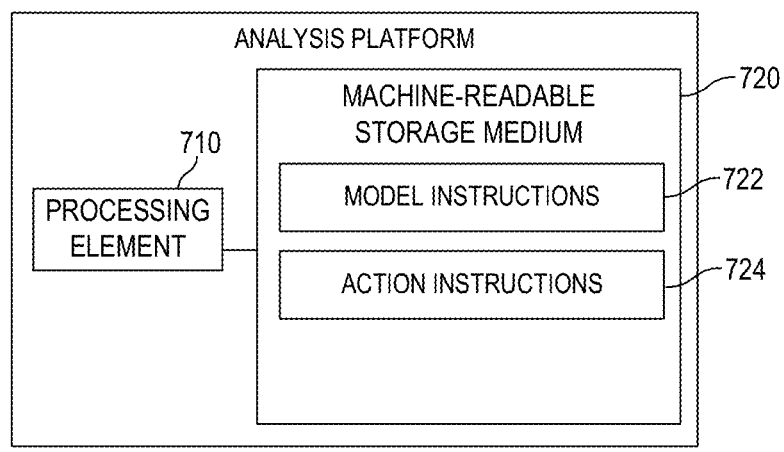
FIG. 7 is a block diagram of an analysis platform capable of updating and/or administering a deep learning model to identify an anomaly, according to an example.

FIG. 6 is a flowchart of a method for taking an administrator action in response to determining that an anomaly exists on a computing device, according to an example. FIG. 7 is a block diagram of an analysis platform capable of updating and/or administering a deep learning model to identify an anomaly, according to an example. Though method 600 is shown as being implemented using analysis platform 700, other devices such as analysis platform 250 can be used.

Processing element 710 may be, one or multiple central processing unit (CPU), one or multiple semiconductor-based microprocessor, one or multiple graphics processing unit (GPU), other hardware devices suitable for retrieval and execution of instructions stored in machine-readable storage medium 720, or combinations thereof. The processing element 710 can be a physical device. Moreover, in one example, the processing element 710 may include multiple cores on a chip, include multiple cores across multiple chips, multiple cores across multiple devices, or combinations thereof. Processing element 710 may fetch, decode, and execute instructions 722, 724 to implement method 600. As an alternative or in addition to retrieving and executing instructions, processing element 710 may include at least one integrated circuit (IC), other control logic, other electronic circuits, or combinations thereof that include a number of electronic components for performing the functionality of instructions 722, 724.

Machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 720 may be encoded with a series of executable instructions for performing an action.

In some examples, the analysis platform 700 can be implemented as software executing on a physical processing element. In one example, the analysis platform 700 can be implemented as software executing using a virtual machine executing on a computing device.

In one example, the analysis platform 700 receives the health information parameter feedback from computing devices. The analysis platform 700 can update the deep learning model based on the deep learning model that was previously used and the health information parameter feedback using similar approaches as during training of the model.

In one example, the analysis platform receives a notification of an anomaly from a management controller (602). Action instructions 724 can be executed by processing element 710 to perform an action in response to receiving the notification. In one example, the action can include requesting an administrator response. At 604, action instructions 724 can be executed by processing element 710 to receive a response from an administrator (604). As noted above, one example of such a response can include that the administrator expects the anomaly to occur and that the model should be updated.

The administrator action can be performed at 606. In one example, the administrator action includes updating the model. The analysis platform 700 can receive health information parameter feedback from multiple computing devices and update the deep learning model to be used by executing model instructions 722 in a manner consistent with the approaches described above. For example, the update can be in response to an updated workload. The updated deep learning model can be provided to the management controllers to use.

Other administrator actions can also be implemented. For example, the notification may indicate to the administrator that an update is needed. The administrator may choose to perform the update. In some examples, this can be performed without administrator interaction.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A first computing device comprising:
a host processing element;
a management controller separate from the host processing element, wherein the management controller is powered by a separate power rail from the host processing element;
a deep learning model including parameters and trained to identify anomalistic behavior of the first computing device,
wherein the management controller is to execute instructions to:
receive health information from a plurality of components of the first computing device,
process the health information according to the deep learning model to determine whether an anomaly has occurred,
in response to determining that the anomaly has occurred, initiate an action,
receive, from an analysis platform, an updated version of the deep learning model as updated by the analysis platform based on an administrator response that is responsive to the action, wherein the update of the deep learning model is based on health information parameter feedback from a plurality of the computing devices after an occurrence of the action, and
process further health information according to the updated version of the deep learning model.

2. The first computing device of claim 1, wherein the deep learning model is based on a pre-trained deep learning model for a specific workload that is associated with the plurality of computing devices.

3. The first computing device of claim 1, wherein the administrator response comprises an indication of a change in a workload on the plurality of computing devices.

4. The first computing device of claim 1, wherein the management controller is further to:
process the health information to generate a portion of the health information parameter feedback; and
send the portion of the health information parameter feedback to the analysis platform.

5. The first computing device of claim 1, wherein the health information parameter feedback comprises a count of a number of occurrences of an event.

6. The first computing device of claim 1, wherein the management controller is further to:
determine a classification for the anomaly,
wherein the action is based on the classification of the anomaly.

7. The first computing device of claim 6, wherein the health information is selected from among a temperature of a component, a count of network packets, power consumption, error information, and a record of firmware or software installed in the first computing device.

8. The first computing device of claim 1, wherein the action comprises quarantining the first computing device from other computing devices of the plurality of computing devices.

9. The first computing device of claim 1, wherein the action comprises updating, in the first computing device, a firmware component to a version that is used by other computing devices of the plurality of computing devices.

10. The first computing device of claim 9, wherein the other computing devices of the plurality of computing devices are of a same model as the first computing device.

11. The first computing device of claim 6, wherein the action comprises sending a notification about the anomaly including the classification.

12. A method comprising:
receiving, by a first management controller of a first computing device of a plurality of computing devices, first health information from a plurality of components of the first computing device, wherein the first computing device includes a first host processing element separate from the first management controller, and wherein the first management controller is powered by a separate power rail from the first host processing element;
processing, by the first management controller, the first health information according to a deep learning model to determine whether a first anomaly has occurred, wherein the deep learning model includes parameters that are trained to identify anomalistic behavior of the first computing device;
sending, from the first computing device to an analysis platform, a portion of health information parameter feedback, the health information parameter feedback received at the analysis platform from the plurality of computing devices;
receiving, at the first computing device from the analysis platform, an updated version of the deep learning model updated based on the health information parameter feedback;
receiving, at a second management controller of a second computing device of the plurality of computing devices, the updated version of the deep learning model, wherein the second computing device includes a second host processing element separate from the second management controller, and wherein the second management controller is powered by a separate power rail from the second host processing element;
receiving, at the second management controller, second health information from a plurality of components of the second computing device; and
processing the second health information according to the updated version of the deep learning model to determine whether a second anomaly has occurred.

13. The method of claim 12, wherein the deep learning model is based on a pre-trained deep learning model for a specific workload that is associated with the plurality of computing devices.

14. The method of claim 12, further comprising:
receiving the health information parameter feedback from the plurality of the computing devices at the analysis platform,
updating, by the analysis platform, the deep learning model based on the health information parameter feedback to produce the updated version of the deep learning model; and
providing the updated version of the deep learning model from the analysis platform to the first computing device and the second computing device.

15. The method of claim 14, further comprising:
processing, by the first management controller, the first health information to generate the portion of the health information parameter feedback.

16. A non-transitory machine-readable storage medium storing instructions that, if executed by a management controller of a computing device, cause the management controller to:
receive health information from a plurality of components of the computing device, wherein the computing device includes a host processing element separate from the management controller, and wherein the management controller is powered by a separate power rail from the host processing element;
process the health information according to a deep learning model to determine whether a first anomaly has occurred, wherein the deep learning model includes parameters that are trained to identify anomalistic behavior of the computing device;
generate health information parameter feedback;
send the health information parameter feedback to an analysis platform;
receive, from the analysis platform, an updated version of the deep learning model updated based on the health information parameter feedback and another health information parameter feedback from another computing device;
determine that a second anomaly has occurred based on the updated version of the deep learning model and additional health information collected from the plurality of components;
determine a classification of the second anomaly; and
take an action in response to the determination that the second anomaly has occurred and based on the classification.

17. The non-transitory machine-readable storage medium of claim 16, wherein the action comprises one or more of quarantining the computing device from other computing devices, or updating a firmware component in the computing device.

18. The non-transitory machine-readable storage medium of claim 16, wherein the deep learning model is based on a pre-trained deep learning model for a specific workload that is associated with a plurality of computing devices.

* * * * *